(12) United States Patent
Sudo et al.

(10) Patent No.: US 6,171,670 B1
(45) Date of Patent: Jan. 9, 2001

(54) SANITARY CONTAINER

(75) Inventors: Morihiro Sudo; Yasushi Kawachi, both of Tokyo (JP)

(73) Assignee: Daikyo Seiko, Ltd., Tokyo (JP)

( * ) Notice: Under 35 U.S.C. 154(b), the term of this patent shall be extended for 0 days.

(21) Appl. No.: 08/801,116

(22) Filed: Feb. 14, 1997

(30) Foreign Application Priority Data

Aug. 19, 1996 (JP) .................................................. 8-234667

(51) Int. Cl.$^7$ .............................. C04B 14/00; B65D 1/00
(52) U.S. Cl. ........................ 428/35.7; 428/36.4; 106/401; 106/499
(58) Field of Search .................................. 428/35.7, 36.4; 106/499, 410, 415, 400, 401; 523/333

(56) References Cited

U.S. PATENT DOCUMENTS

| | | |
|---|---|---|
| 4,102,848 * | 7/1978 | Koch et al. .......................... 260/31.6 |
| 4,441,621 | 4/1984 | Matukura et al. . |
| 4,614,276 | 9/1986 | Ihara et al. . |
| 4,839,429 | 6/1989 | Tajima . |
| 4,883,206 | 11/1989 | Miller . |
| 4,889,429 | 12/1989 | Heinzmann et al. . |
| 4,915,243 | 4/1990 | Tatsumi et al. . |
| 4,997,423 | 3/1991 | Okuda et al. . |
| 5,009,646 | 4/1991 | Sudo et al. . |
| 5,078,941 | 1/1992 | Tatsumi et al. . |
| 5,110,621 | 5/1992 | Sudo et al. . |
| 5,114,749 | 5/1992 | Nishio et al. . |
| 5,208,012 | 5/1993 | Sudo et al. . |
| 5,288,560 | 2/1994 | Sudo et al. . |
| 5,578,407 * | 11/1996 | Kasuya et al. ........................ 430/106 |
| 5,599,869 * | 2/1997 | Kurz .................... 524/495 |
| 5,648,408 * | 7/1997 | Babler ................. 523/333 |
| 5,667,580 * | 9/1997 | Babler ................. 106/499 |
| 5,674,948 * | 10/1997 | Vonk ................. 525/329.4 |
| 5,686,515 * | 11/1997 | Phillips et al. ....................... 524/275 |

* cited by examiner

*Primary Examiner*—Rena L. Dye
(74) *Attorney, Agent, or Firm*—Oblon, Spivak, McClelland, Maier & Nuestadt, P.C.

(57) ABSTRACT

A sanitary container is molded from a plastic, for example, a cyclic olefin polymer or a hydrogenation product thereof. The plastic has been added with at least one pigment selected from the group consisting of C.I. Pigment Yellow 147, C.I. Pigment Yellow 180 and C.I. Pigment Yellow 181. The content of the at least one pigment may preferably range from 0.01 to 0.3 wt. % based the plastic.

5 Claims, No Drawings

SANITARY CONTAINER

BACKGROUND OF THE INVENTION

1. Field of the Invention

This invention relates to a plastic-made sanitary container capable of stably storing a medicine such as a vaccine, antibiotic, vitamin or amino acid, a nutrient solution, a transfusion solution, a cosmetic, a food such as a seasoning agent, or the like over a long period of time while maintaining cleanliness.

2. Description of the Related Art

Medicines, foods, cosmetics and other sanitary products have conventionally been stored in sanitary containers in many instances. Such sanitary containers must be able to protect their contents from intrusion of microorganisms and also to prevent their contents from a quality change, deterioration or the like by ultraviolet rays or the like.

The intrusion of microorganisms into a container is prevented by sealing the container or hermetically closing the container with a rubber plug or the like, whereas the quality change, deterioration or the like of a content by ultraviolet rays or the like is avoided by adding a deterioration preventive to the content or adding an ultraviolet absorber to a sanitary container itself.

Incidentally, glass-made containers have conventionally been used for many years as containers most suited from viewpoint of sanitation for medicines, nutrient solutions, transfusion solutions, foods and the like.

Glass-made containers are often made of soda-lime glass (soft glass), because soda-lime glass as a raw material for the glass-made containers permits easy melting and molding, has chemical durability and is of low price. A container made of soft glass may however undergo a quality or property change at a glass surface thereof by moisture in the surrounding atmosphere or by a solution contained therein. Described specifically, the glass may be hydrolyzed with water so that an alkali ($Na^+$) may be dissolved out into the solution contained in the container or tiny chips called "flakes" may be formed.

Upon use of a glass-made container as a container for a sanitary product such as a medicine, the glass-made container may be subjected at an inner wall there-of to bloom treatment that the inner wall is treated with sulfur, sulfurous acid gas, ammonium sulfate or the like to eliminate alkalis, or a pH-regulating buffer, a quality or property change preventive or the like may be added to the content.

On the other hand, a container made of borosilicate glass (hard glass) undergoes alkali dissolution or flake formation, such as that mentioned above, less compared with a container made of soft glass. Hard glass is therefore most suited for the production of containers (ampoules) for injectable preparations, which containers (ampoules) require higher chemical durability. If the temperature or time is inadequate upon processing such as production of a container, hard glass may also become non-uniform in its glass structure so that an alkali may be dissolved out from an inner wall of the container or flakes may be formed from the inner wall of the container. To cope with this potential problem, surface treatment such as bloom treatment or fluoride treatment may be applied to the inner wall of the container, or silica coating or the like may be performed by coating $SiO_2$ on the inner wall of the container by a CVD process or the like to form a coating of $SiO_2$ there.

If a medicine, food or the like in a glass-made container is inferior in light resistance (ultraviolet light resistance), the transparency as a merit of the glass-made container conversely acts as a demerit. Iron-manganese compound or the like is therefore added to glass so that the glass-made container is used as a colored, light-shielding glass-made container. In this case, however, there is a potential problem that these metals may mix in the content such as the medicine or food.

In addition to the above-described problem of dissolution-out of alkalis on glass-made containers, there is another potential problem that may arise upon opening glass-made ampoules. Recent ampoules include an increasing number of ampoules which like ampoules of the easy-cut type, can be easily opened without using any special tool. It has however been pointed out that like conventional ampoules, such recent ampoules also become dangerous due to formation of sharp edges at cut faces and upon being cut, they form glass chips having a potential danger when mixed in medicine solutions. A glass-made container may have a still further problem that depending on the kind of a-medicine, the glass-made container may adsorb thereon the medicine in a greater amount than a plastic-made container.

Concerning the quality of glass upon its use as a material for medicine containers, various standard values are specified from the standpoints of safety and sanitation under the "Testing Method for Glass Containers for Injectable Preparations" in The Pharmacopoeia of Japan (thirteenth edition) (hereinafter, abbreviated as "JP13") and also in the United States Pharmacopeia XXIII (hereinafter abbreviated as "USP"), the British Pharmacopoeia (hereinafter abbreviated as "BP"), and the like.

To avoid such problems, there is now an increasing tendency to adopt plastic-made containers in place of glass-made containers. As official standards for plastic-made containers, there are standards for polyethylene (PE), polypropylene (PP) and polyvinyl chloride (PVC) as specified in the eighth edition of the Pharmacopoeia of Japan (1971). Further, testing methods for plastic containers for transfusion solutions are also specified in the USP 17, the BS, the Pharmacopoeia of France, the Pharmacopoeia of Switzerland, Deutsche Industrie Norm (DIN—German Industrial Standards) (DIN58365), etc. They are also specified in Notification No. 370 of the Ministry of Health and Welfare issued under the Food Sanitation Law, Notification No. 20 of the same Ministry issued under the same Law (February, 1982), and the Food Additive Support F of U.S. Food and Drug Administration (FDA).

Plastics have an advantage over glass in that the former are lighter in weight than the latter. On the other hand, plastics are accompanied by disadvantages such that depending on the kinds of the plastics, they have poor moldability or formability and/or can provide only molded or otherwise formed products having insufficient strength and/or inferior gas transmission resistance and/or water vapor transmission resistance. Moreover, plastics are also inferior in ultraviolet ray transmission resistance (ultraviolet ray shielding property) to glass. It was therefore the situation that no plastics equipped in a well-balanced manner with properties required for sanitary containers had been found yet [see Japanese Patent Application Laid-Open (Kokai) No. HEI 5-293159].

Incidentally, concerning the light-shielding property (ultraviolet ray transmission resistance) of a colored container, the "Testing Method for Glass Containers for Injectable Preparations" in The Pharmacopoeia of Japan (thirteenth edition) specifies that the transmission rate should be 50% or lower at wavelengths of from 290 to 450 nm and 60% or higher (45% or higher in the case of a container having a wall thickness of 1.0 mm or greater) at wavelengths of form 590 to 610 nm. On the other hand, it is also specified in the USP that the transmission rate of a plastic-made container should be 15% or lower at wavelengths of from 290 to 450 nm.

Under the foregoing situation, the present applicant found that a cyclic olefin polymer is suited as a plastic for sanitary containers, and already filed a patent application thereon.

However, the cyclic olefin polymer is also poor in ultraviolet ray transmission resistance (ultraviolet let shielding property) like conventional plastics, and sanitary containers made of the cyclic olefin polymer have a potential problem that their contents may be changed or deteriorated in quality by such rays.

SUMMARY OF THE INVENTION

The present inventors have therefore proceed with extensive research to impart ultraviolet ray transmission resistance (ultraviolet ray shielding property) to plastic-made sanitary containers. As a result, it has been found that a certain type of organic pigments are significantly effective in shielding ultraviolet rays without lowering the transparency of plastics, leading to the completion of the present invention.

In one aspect of the present invention, there is thus provided a sanitary container molded from a plastic added with at least one pigment selected from the group consisting of C.I. Pigment Yellow 147, C.I. Pigment Yellow 180 and C.I. Pigment Yellow 181.

The sanitary container according to the present invention can cut off ultraviolet rays with coloration of such an extent as still permitting easy visual recognition of its content.

Use of the sanitary container according to the present invention therefore makes it possible to stably store a material legally regulated under the Pharmacopoeia of Japan, the Food Sanitation Law or the like, for example, a material requiring sanitation such as a medicine such as a vaccine, antibiotic, vitamin, saccharide, amino acid or electrolyte, a nutrient solution, a transfusion solution, a cosmetic, a food such as a seasoning agent, or the like or a material similar to the above-mentioned material over a long period of time while maintaining cleanliness.

DETAILED DESCRIPTION OF THE INVENTION AND PREFERRED EMBODIMENTS

The present invention will next be described specifically by referring to certain embodiments of the present invention.

Examples of the plastic useful for the production of the plastic-made sanitary container in the present invention include those conventionally employed for the production of sanitary containers, such as PE, PP, PVC and PET (polyethylene terephthalate), and cyclic olefin polymers and hydrogenation products thereof. Particularly preferred for the object of the present invention are cyclic olefin polymers and hydrogenation products thereof.

The cyclic olefin polymers or the hydrogenation products thereof can be ring-opened homopolymers of cyclic olefin monomers, ring-opened copolymers of cyclic olefin monomers and other monomers, addition homopolymers of cyclic olefin monomers, addition copolymers of cyclic olefin monomers and other monomers, and hydrogenation products of such homopolymers or copolymers.

The above cyclic olefin monomers include monocyclic olefin monomers, and polycyclic olefin monomers including bicyclic and higher cyclic compounds, as will be exemplified below.

Illustrative of the monocyclic olefin monomers usable for the production of the homopolymers or copolymers of the cyclic olefin monomers are monocyclic olefin monomers such as cyclopentene, cyclopentadiene, cyclohexene, methylcyclohexene and cyclooctene; lower-alkyl derivatives thereof containing, as substituent groups, 1 to 3 lower alkyl groups such as methyl and/or ethyl groups; and acrylate derivatives thereof.

Illustrative of the polycyclic olefin monomers are dicyclopentadiene, 2,3-dihydrocyclopentadiene, bicyclo[2,2,1]-hepto-2-ene and derivatives thereof, tricyclo[4,3,0,1$^{2,5}$]-3-decene and derivatives thereof, tricyclo[4,4,0,1$^{2,5}$]-3-undecene and derivatives thereof, tetracyclo[4,4,0,1$^{2,5}$,0$^{7,10}$]-3-dodecene and derivatives thereof, pentacyclo[6,5,1,1$^{3,6}$,0$^{2,7}$,0$^{9,13}$]-4-pentadecene and derivatives thereof, pentacyclo[7,4, 0,1$^{2,5}$,0,0$^{8,13}$,1$^{9,12}$]-3-pentadecene and derivatives thereof, and hexacyclo[6,6,1, 1$^{3,6}$,1$^{10,13}$,0$^{2,7}$,0$^{9,14}$]-4-heptadecene and derivatives thereof.

Examples of bicyclo[2,2,1]-hepto-2-ene derivatives include 5-methyl-bicyclo[2,2,1]-hepto-2-ene, 5-methoxy-bicyclo[2,2,1]-hepto-2-ene, 5-ethylidene-bicyclo[2,2,1]-hepto-2-ene, 5-phenyl-bicyclo[2,2,1]-hepto-2-ene, and 6-methoxycarbonyl-bicyclo[2,2,1-]-hepto-2-ene.

Examples of tricyclo[4,3,0,1$^{2,5}$]-3-decene derivatives include 2-methyl-tricyclo[4,3,0,1$^{2,5}$]-3-decene and 5-methyl-tricyclo[4,3,0,1$^{2,5}$]-3-decene.

Examples of tetracyclo[4,4,0,1$^{2,5}$]-3-undecene derivatives include 10-methyl-tetracyclo[4,4,0,1$^{2,5}$]-3-undecene, and examples of tricyclo[4,3,0,1$^{2,5}$]-3-decene derivatives include 5-methyl-tricyclo[4,3,0,1$^{2,5}$]-3-decene.

Examples of tetracyclo[4,4,0,1$^{2,5}$,0$^{7,10}$]-3-dodecene derivatives include 8-ethylidene-tetracyclo-[4,4,0,1$^{2,5}$,0$^{7,10}$]-3-dodecene, 8-methyl-tetracyclo-[4,4,0,1$^{2,5}$,0$^{7,10}$]-3-dodecene, 9-methyl-8-methoxy-carbonyl-tetracyclo[4,4,0, 1$^{2,5}$,0$^{7,10}$]-3-dodecene, 5,10-dimethyl-tetracyclo[4,4,0,1$^{2,5}$, 0$^{7,10}$]-3-dodecene.

Examples of hexacyclo[6,6,1,1$^{3,6}$,1$^{10,13}$,0$^{2,7}$, 0$^{9,14}$]-4-heptadecene derivatives include 12-methyl-hexacyclo[6,6,1, 1$^{3,6}$,1$^{10,13}$,0$^{2,7}$,0$^{9,14}$]-4-heptadecene and 1,6-dimethyl-hexacyclo[6,6,1,1$^{3,6}$,1$^{10,13}$,0$^{2,7}$, 0$^{9,14}$]-4-heptadecene.

One example of the cyclic olefin polymer is an addition homopolymer of at least one cyclic olefin monomer or an addition copolymer of at least one cyclic olefin monomer and at least one other olefin monomer (for example, ethylene, propylene, 4-methylpentene-1, cyclopentene, cyclooctene, butadiene, isoprene, styrene or the like). This homopolymer or copolymer can be obtained by polymerizing the above monomer or monomers, for example, while using as a catalyst a known catalyst which is soluble in a hydrocarbon solvent and is composed of a vanadium compound or the like and an organoaluminum compound or the like [Japanese Patent Application Laid-Open (Kokai) No. HEI 6-157672, Japanese Patent Application Laid-Open (Kokai) No. HEI 5-43663, etc.].

Another example of the cyclic olefin polymer is a ring-opened homopolymer of the above monomer or a ring-opened copolymer of the above monomers. It can be obtained by homopolymerizing the above monomer or copolymerizing the above monomers, for example, while using as a catalyst a known catalyst such as (1) a catalyst composed of a halide or the nitrate of a platinum group metal such as ruthenium, rhodium, palladium, osmium or platinum and a reducing agent or (2) a catalyst composed of a compound of a transition metal such as titanium, molybdenum or tungsten and an organometal compound of a metal in one of Groups I to IV of the periodic table such as an organoaluminum compound or organotin compound [Japanese Patent Application Laid-Open (Kokai) No. HEI 6-157672, Japanese Patent Application Laid-Open (Kokai) No. HEI 5-43663, etc.].

Where the homopolymer or copolymer obtained as described above-contains unsaturated bonds, the homopolymer or copolymer is hydrogenated by using a known hydrogenation catalyst. Examples of the hydrogenation catalyst include (1) Ziegler-type homogeneous catalysts which are each composed of an organic acid salt of titanium, cobalt, nickel or the like and an organometal compound of lithium, aluminum or the like, (2) supported catalysts which are each composed of a carrier such as carbon or alumina and a platinum metal such as palladium or ruthenium supported on the carrier, and (3) catalysts which are each composed of a complex of one of the above-described platinum group metal [Japanese Patent Application Laid-Open (Kokai) No. HEI 6-157672].

In the present invention, examples of the above-described hydrogenated homopolymer or copolymer include ring-opened homopolymers or copolymers and addition homopolymers or copolymers of polycyclic saturated hydrocarbon compounds containing two or more rings, which polycyclic saturated hydrocarbon compounds may have one or more substituent groups containing a polymerizable double bond.

Examples of such polycyclic hydrocarbon compounds include tricyclo[4,3,0,1$^{2,5}$]-decane, bis(allyloxy-carboxy)-tricyclo[4,3,0,1$^{2,5}$]-decane, bis(methacryl-oxy)-tricyclo[4,3,0,1$^{2,5}$]-decane, and bis(acryloxy)-tricyclo[4,3,0,1$^{2,5}$]-decane.

The pigment, which is added to the above-described plastic to reduce the transmission of ultra-violet rays in the present invention, is C.I. Pigment Yellow 147 [chemical name: 1,1'-[(6-phenyl-1,3,5-triazine- 2,4-diyl)-diimino]bis-9,10-anthracenedione], C.I. Pigment Yellow 180 [chemical name: 2,2'-[1,2-ethanediylbis(oxy-2,1-phenyleneazo)]bis [N-(2,3-dihydro-2-oxo-1H-benzimidazol-5-yl)-3-oxobutanamide], C.I. Pigment Yellow 181 [chemical name: N-[4-(aminocarbonyl)-phenyl]-4-[[1-[[2,3-dihydro-2-oxo-1H-benzimidazol-5-yl)amino]carbonyl]-2-oxopropyl]azo] benzamide], or a mixture thereof. These pigments are represented by the below-described structural formulas, respectively. Needless to say, these pigments are all readily available on the market for use in the present invention and have no problem in safety and sanitation.

C.I. Pigment Yellow 147

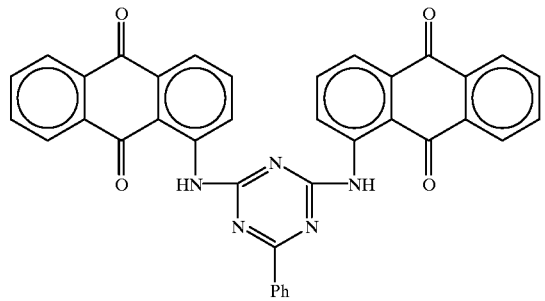

C.I. Pigment Yellow 180

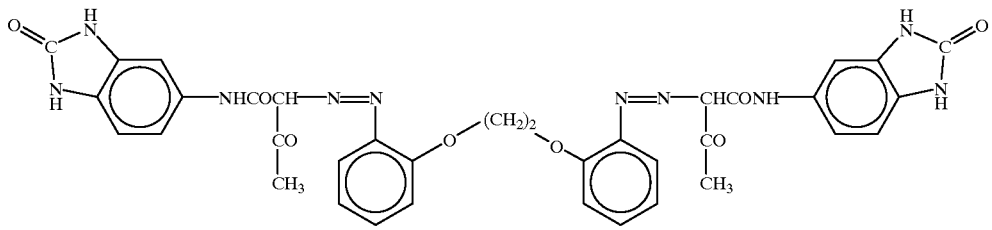

-continued

C.I. Pigment Yellow 181

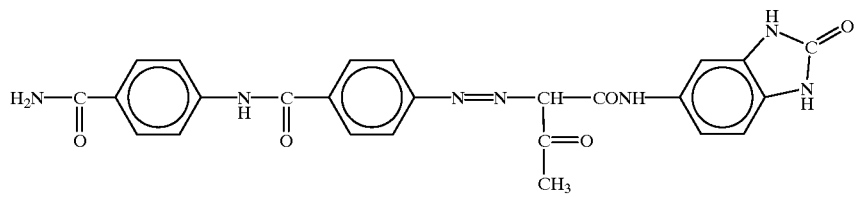

No particular limitation is imposed on the amount of the pigment to be used. However, an unduly small amount cannot provide sufficient light-shielding property (ultraviolet ray transmission resistance) but an unduly large amount makes the coloration excessively deep and hence makes difficult the visibility of the content of the container. A preferred amount ranges from 0.01 to 0.3 wt. % based on the plastic. To facilitate dispersion of the pigment in the plastic upon molding the container, it is preferred to knead the pigment with a vehicle resin in advance so that the pigment can be used as a high-concentration master batch (pigment concentration: 10 to 60 wt. %).

The plastic-made sanitary container according to the present invention can be produced by suitably adding the above-described pigment and a phenol-base, thioether-base, phosphorus-base or the like age resister, an ultraviolet absorber, a higher fatty acid or an ester thereof and a processing aid such as a silicone oil, as needed, to the plastic, mixing and kneading the resultant mixture into a compound (composition) in a conventional mixer such as a kneader, roll mixer or extruder, and then forming the compound into the container of a desired shape by one of various molding processes such as injection molding, combined injection-blow molding and combined extrusion-blow molding. It is to be noted that no particular limitation is imposed on the shape or the like and the molding process of the container in the present invention.

Plastic-made sanitary containers according to the present invention can be used as containers of various shapes, for example, as containers for medicines, nutrient solutions and transfusion solutions, such as ampoules and vials; as contains for syringes; as containers for various cosmetics; and as containers for various foods such as oils and soy sauce, for example, bottles.

The present invention will next be described specifically by the following examples and comparative example, in which the designations of "part" or "parts" and "%" are by weight basis unless otherwise specifically indicated.

EXAMPLE 1

Compounds with C.I. Pigment Yellow 147 ("Filester Yellow RN", trade name; product of Ciba-Geigy Japan Limited) added in amounts of 0.05%, 0.1% and 0.2%, respectively, per 100 parts of a cyclic olefin polymer containing 0.2 part of an age resister ("Zeonex", trademark; product of Nippon Zeon Co., Ltd.) were produced using a Brabender Plastograph. Using those compounds, vials of 25 ml in capacity were produced by injection molding. Those vials became deeper in yellowish coloration with the content of the pigment, but retained transparency.

At the same time, 2-mm thick sheets were also formed from the respective compounds by press forming. With respect to each of the sheets, its light transmission rate was measured at wavelengths of from 290 to 450 nm and also at wavelengths of from 590 to 610 nm by a double-beam spectrophotometer ("Model 150-20", trade name; manufactured by Hitachi Ltd.). The results are shown below in Table 1.

TABLE 1

| Content of pigment | Transmission rate of light (%) | |
|---|---|---|
| (%) | 290–450 nm | 590–610 nm |
| 0 | 90≧ | ≧90 |
| 0.05 | 35 | ≧85 |
| 0.1 | 15 | ≧75 |
| 0.2 | 10 | ≧45 |

EXAMPLE 2

Vials were produced in the same manner as in Example 1 except for the use of C.I. Pigment Yellow 180 instead of C.I. Pigment Yellow 147. Those vials became deeper in yellowish coloration with the content of the pigment, but retained transparency.

At the same time, 2-mm thick sheets were also formed from the same compounds, respectively, by press forming. With respect to each of the sheets, its light transmission rate was measured at wavelengths of from 290 to 450 nm and also at wavelengths of from 590 to 610 nm by the double-beam spectrophotometer ("Model 150-20", trade name; manufactured by Hitachi Ltd.). The results were substantially the same as those obtained in Example 1.

EXAMPLE 3

Vials were produced in the same manner as in Example 1 except for the use of C.I. Pigment Yellow 181 instead of C.I. Pigment Yellow 147. Those vials became deeper in yellowish coloration with the content of the pigment, but retained transparency.

At the same time, 2-mm thick sheets were also formed from the same compounds, respectively, by press forming. With respect to each of the sheets, its light transmission rate was measured at wavelengths of from 290 to 450 nm and also at wavelengths of from 590 to 610 nm by the double-beam spectrophotometer ("Model 150-20", trade name; manufactured by Hitachi Ltd.). The results were substantially the same as those obtained in Example 1.

EXAMPLE 4

Vials were produced in the same manner as in Example 1 except for the use of another cyclic olefin polymer ("APEL COC", trade name; product of Mitsui Petrochemical Industries, Ltd.) instead of the cyclic olefin polymer. Those vials became deeper in yellowish coloration with the content of the pigment, but retained transparency.

At the same time, 2-mm thick sheets were also formed from the respective compounds by press forming. With respect to each of the sheets, its light transmission rate was measured at wavelengths of from 290 to 450 nm and also at wavelengths of from 590 to 610 nm by a double-beam spectrophotometer ("Model 150-20", trade name; manufactured by Hitachi Ltd.). The results were substantially the same as those obtained in Example 1.

Comparative Example 1

Vials were produced in the same manner as in Example 1 except for the omission of the pigment.

Comparative Example 2

Vials were produced in the same manner as in Example 4 except for the omission of the pigment.

Comparative Example 3

Vials were produced in the same manner as in Example 1 except that instead of the pigment, 2-hydroxy-4-methoxybenzophenone ("Biosorb-100", trade name; product of Kyodo Chemical Co., Ltd.), an ultraviolet absorber, was used in an amount of 0.2%.

Tests

The vials obtained above in Examples 1–4 and Comparative Examples 1–3 were subjected to the below-described tests after they had been thoroughly washed. With respect to Examples 1–4, the tests were conducted on the vials which had the pigment concentration of 0.2%.

(1) Dissolution Test

A dissolution test was conducted following the "Testing Method for Plastic Containers for Aqueous Infusions" prescribed in the Pharmaof Japan, Twelfth Edition.

(2) Quantity of Fine particles

Each vial was filled with 20 ml of dust-free water. After the vial was shaken for 10 minutes on a shaking machine, the vial was left standstill for 1 hour, and fine particles in the water, said fine particles being of 2.5 μm or greater in particle size, were counted by a light-shielded, automatic fine particle counter (manufactured by HIAC Corp.)

(3) Adsorption Test of Medical Solution

An ampoule of "Contomin Injection" (trade name; product of Yoshitomi Pharmaceutical Industrial Co., Ltd.), which contained chlorpromazine hydrochloride at a concentration of 25 mg/5 ml, was added to physiological saline. The resulting solution was adjusted to pH 7.0 with a hydrogen ion concentration regulator (product of Wako Pure Chemical Industries, Ltd.) to provide 500 ml of a testing medical solution. Each vial was filled with this testing medical solution, sealed by a rubber plug which was covered with a fluorinated resin film, and was allowed to stand for 10 months at room temperature. The content of chlorpromazine hydrochloride in the vial was determined by measuring an absorption of the testing medical solution at a wavelength of 245 nm by a spectrophotometer ("Model UV2100", trade name; manufactured by Shimadzu Corp.). Assuming that the concentration of chlorpromazine hydrochloride immediately after the filling was 100%, an adsorbed quantity was expressed in terms of a decrease (%) in the concentration of chlorpromazine hydrochloride after allowed to stand for 10 months.

(4) Photo-deterioration Test

In a similar manner as the preparation of the medical solution in the above-described adsorption test, a medical solution containing vitamin $K_1$ and vitamin $B_2$ was prepared. Each vial was filled with this medical solution, followed by the exposure to ultraviolet rays (principal wavelengths: 340 to 450 nm) for 36 hours under a sunshine weatherometer ("We-SUN-He", trade name; manufactured by Suga Shikenki K.K.). After the exposure, an adsorbed quantity of the medical solution [as measured in the same manner as in the above-described adsorption test (3)] and photo-degradations of vitamin $K_1$ and vitamin $B_2$ were determined. During the test, each vial was kept plugged. Incidentally, the photo-degradations of vitamin $K_1$ and vitamin $B_2$ were determined by the following methods:

(a) Vitamin $K_1$

The concentration of vitamin $K_1$ still remaining in the medical solution in each vial after the exposure was measured at a wavelength of 254 nm by a UV detector. Assuming that the concentration of vitamin $K_1$ before the exposure was 100%, the concentration of vitamin $K_1$ after the exposure was expressed in terms of percentage (%)

(b) Vitamin $B_2$

The concentration of vitamin $B_2$ still remaining in the medical solution in each vial after the exposure was measured at a wavelength of 445 nm by an automatic spectrophotometer ("Model EPS-3T", trade name; manufactured by Hitachi Ltd.). Assuming that the concentration of vitamin $B_2$ before the exposure was 100%, the aconcentration of vitamin $B_2$ after the exposure was expressed in terms of percentage (%).

The results of the above tests are shown below in Table 2.

It is evident from the results of the tests that the container according to the present invention can pass the dissolution test prescribed in the Pharmacopoeia of Japan and has excellent ultraviolet ray shielding property.

TABLE 2

|  |  | Example | | | | Comparative Example | | |
| --- | --- | --- | --- | --- | --- | --- | --- | --- |
|  |  | 1 | 2 | 3 | 4 | 1 | 2 | 3 |
| The Pharmacopoeia of Japan | pH | 0.05 | 0.05 | 0.05 | 0.1 | 0.2 | 0.1 | 0.1 |
|  | $KMnO_4$-reducing substance | 0.15 | 0.2 | 0.2 | 0.2 | 0.2 | 0.2 | 0.7 |
|  | Residue on evaporation | 0.2 | 0.2 | 0.2 | 0.3 | 0.2 | 0.2 | 0.2 |

TABLE 2-continued

|  |  | Example | | | | Comparative Example | | |
| --- | --- | --- | --- | --- | --- | --- | --- | --- |
|  |  | 1 | 2 | 3 | 4 | 1 | 2 | 3 |
|  | UV spectrum | 0.07 | 0.09 | 0.12 | 0.13 | 0.01 | 0.01 | 0.1 |
| Quantity of fine particles |  | 0 | 0 | 0 | 0 | 0 | 0 | 2 |
| Adsorbed quantity of medical solution |  | 0.6 | 0.3 | 0.4 | 0.3 | 0.5 | 0.5 | 0.6 |
| Photo-degradation test | Adsorbed quantity of medical solution | 2.0 | 1.2 | 0.8 | 1.6 | 10.1 | 11.0 | 5.3 |
|  | Vitamin $K_1$ | 80 | 76 | 81 | 84 | 12 | 11 | 34 |
|  | Vitamin $B_2$ | 89 | 80 | 87 | 93 | 26 | 27 | 53 |

What is claimed is:

1. A sanitary container molded from a plastic added with an ultraviolet ray shielding effective amount of at least one pigment selected from the group consisting of C.I. Pigment Yellow 147, C.I. Pigment Yellow 180 and C.I. Pigment Yellow 181, where said plastic is selected from the group consisting of cyclic olefin polymers and hydrogenation products of cyclic olefin polymers.

2. The sanitary container according to claim 1, wherein the pigment is Pigment Yellow 147.

3. The sanitary container according to claim 1, wherein the pigment is C.I. Pigment Yellow 180.

4. The sanitary container according to claim 1, wherein the pigment is C.I. Pigment Yellow 181.

5. The sanitary container according to claim 1, wherein the container is transparent.

* * * * *